March 29, 1960   A. C. BYRNS   2,930,676
PREPARATION OF SODIUM ALUMINUM FLUORIDE AND
SILICON-ALUMINUM ALLOY
Filed Jan. 7, 1953   2 Sheets-Sheet 1

INVENTOR.
Alva C. Byrns.
BY James E. Toomey
Atty.

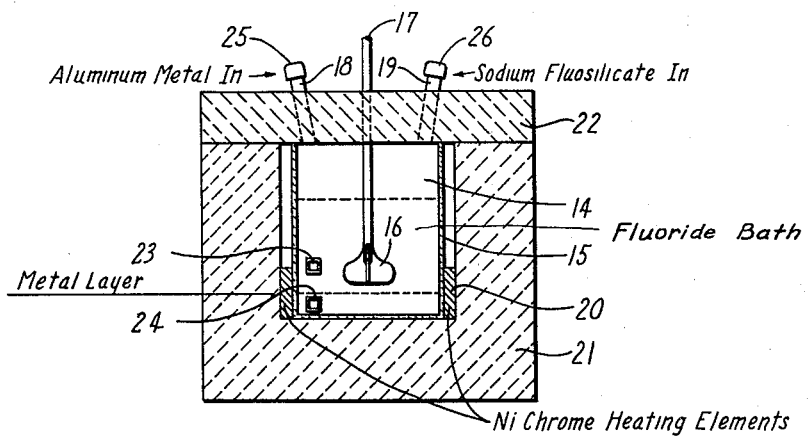
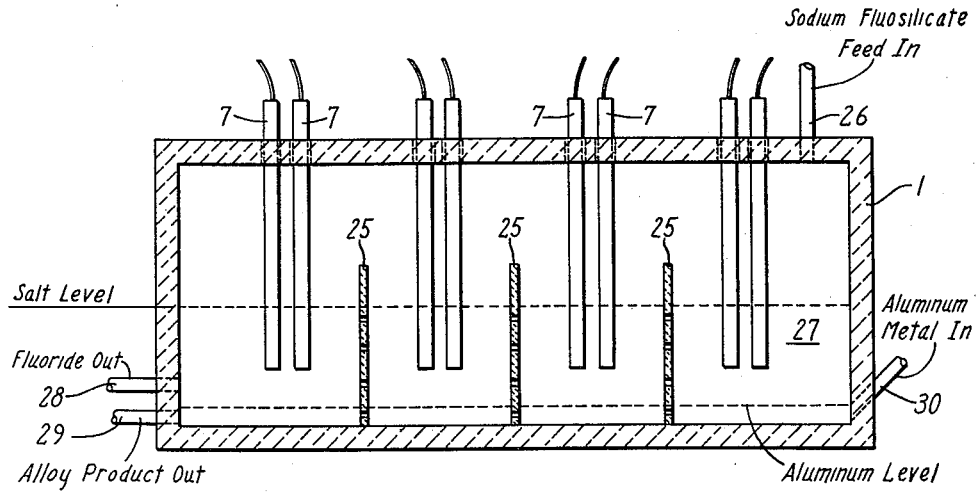

United States Patent Office 2,930,676
Patented Mar. 29, 1960

2,930,676

PREPARATION OF SODIUM ALUMINUM FLUORIDE AND SILICON-ALUMINUM ALLOY

Alva C. Byrns, Lafayette, Calif., assignor to Kaiser Aluminum & Chemical Corporation, Oakland, Calif., a corporation of Delaware Application January 7, 1953, Serial No. 330,130

11 Claims. (Cl. 23—88)

This invention relates to a process for the production of sodium aluminum fluorides; and it also relates to the production of silicon-aluminum alloys. More particularly, this invention relates to a process for producing sodium aluminum fluorides such as synthetic cryolite or chiolite or mixtures thereof, particularly wherein these fluorides are low in silicon, the products being obtained in high yield; and to the production of silicon-aluminum alloys of high silicon content.

It has been known that sodium fluosilicate can be reacted with molten aluminum to produce silicon-aluminum alloys and artificial cryolite ($Na_3AlF_6$) or chiolite ($5NaF \cdot 3AlF_3$) containing more or less aluminum fluoride. However, processes as heretofore practiced have resulted in an excessive loss of reactants and a corresponding reduction in the yields of products obtained. They are further characterized by producing synthetic cryolite and/or chiolite having such high silicon content as to render the product unsuitable for use in the well-known aluminum reduction processes. Wet methods have also been known for obtaining synthetic cryolites, chiolites and other similar substances but they entail the use of many steps, much equipment and very careful techniques and, thus, are not economically satisfactory. Furthermore, in certain reactions there is always some carry-down of the silicon and efforts to reduce it to a useful value have not been satisfactory. Accordingly, it is desirable to provide an economical and efficient method for producing these aluminum compounds.

It is an important object of the present invention to provide a method for substantially completely converting sodium fluosilicate and aluminum to sodium aluminum fluoride and silicon-aluminum alloy.

It is another object of the present invention to provide a method for producing sodium aluminum fluoride which is low in silicon, and silicon-aluminum alloy of high silicon content.

It is a further object of this invention to provide a method for continuously producing sodium aluminum fluorides and silicon-aluminum alloys without excessive loss of the reactants involved and with a minimum silicon content in the salt product.

These and other objects of this invention will be apparent from the following description. The annexed drawings will assist in explaining the present invention and represent in schematic form suitable devices for carrying out the process of this invention:

Fig. 3 is a sectional view of another device useful in carrying out the process of the present invention.

Fig. 4 is a sectional view of another device particularly suited to the carrying out of a continuous process according to the present invention.

Figure 1:
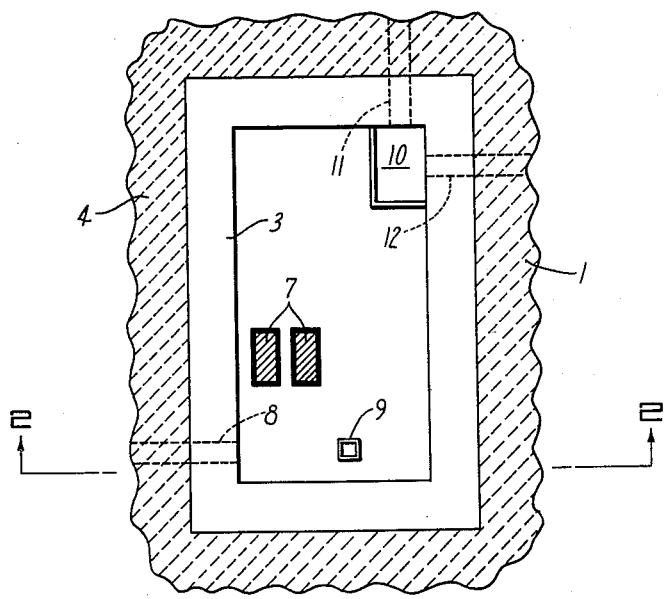
Fig. 1 is a top plan view of a reaction furnace with the cover removed, useful in the practice of the present invention.

According to the present invention it has now been found that sodium aluminum fluoride in high yield and of good quality can be obtained by reacting, with vigorous agitation, a silicon tetrafluoride component, chosen from the group consisting of silicon tetrafluoride and sodium fluosilicate, and molten aluminum, while the former is continuously added and dissolved or dispersed in a molten fluoride bath consisting essentially of sodium aluminum fluoride or sodium fluoride or a mixture of the two. The silicon tetrafluoride component is continuously added to the molten bath, with vigorous agitation. The sodium aluminum fluoride bath can advantageously be sodium aluminum fluoride as made in a previous operation of this invention, or it can be cryolite or chiolite or any desired mixture of these fluorides. The continuous addition to the bath of the silicon tetrafluoride component and the vigorous agitation enables maintaining a low instantaneous concentration of $SiF_4$ in the bath, that is, enables maintaining a low vapor pressure of less than one atmosphere of $SiF_4$ in the atmosphere above the reaction mass. The reaction zone and the reacting mass therein are maintained at a temperature of at least 800° C.

The aluminum metal employed in the present process can be aluminum, such as pure aluminum containing 99.9% or more of aluminum, or an aluminum alloy, that is, aluminum containing at least more than 50% aluminum and the balance alloy ingredients such as copper, iron, manganese and the like. Minor amounts of impurities can be present, which do not adversely affect the properties of the resulting master or pre-alloy or the sodium aluminum fluorides produced. The aluminum can be delivered to the reaction zone in the form of pellets, drillings, powder, pig etc. In a preferred embodiment, however, the aluminum is melted and is added to the reaction zone which is at a temperature of about 850° C. to about 1000° C. It will be understood that where aluminum metal in solid form is added to the reaction zone, sufficient heat must be added to that zone to melt the aluminum and also to maintain the temperature within the range set forth above.

The silicon tetrafluoride component referred to above can be added as silicon tetrafluoride or it can be added as sodium fluosilicate. In the embodiment wherein silicon tetrafluoride, $SiF_4$, is employed as starting material, the gaseous compound from any desired source is fed continuously into a molten fluoride bath as described, in a pressure-tight reaction vessel, with vigorous stirring and brought into reactive contact with the aluminum metal within the temperature ranges given, to form aluminum fluoride and aluminum-silicon alloy. The molten fluoride bath in this embodiment preferably contains predominantly sodium fluoride in order to provide as end-product a sodium aluminum fluoride with the aluminum fluoride produced in the reaction. The bath in this embodiment can advantageously consist essentially of sodium fluoride. The invention will be described in more detail below, with particular reference to using sodium fluosilicate.

Sodium fluosilicate is preferably employed, and it can be in the form of a powder but advantageously it is added as agglomerates. The fluosilicate can be nodulized, pelleted or compacted under pressure in any desired manner, in a preferred operation. If desired it can be admixed with a minor amount of finely divided aluminum to serve as a binder and this mixture then pelleted or compacted in any desired manner. However, it is less expensive and is preferred to compact the fluosilicate alone and add to the fluoride bath. The sodium fluosilicate ($Na_2SiF_6$ or $2NaF \cdot SiF_4$) provides what, for convenience, can be called the silicon tetrafluoride component because it is postulated that the aluminum reacts with the $SiF_4$ portion of this substance or molecule to form aluminum fluoride and silicon, the lattere combining with excess aluminum or alloying therewith. The mechanism of the reaction is not precisely known, however, and it may be that the fluosilicate ion enters into reaction. The theories expressed herein are given only as possible explanations of what may occur. For instance, when $SiF_4$ is added, as disclosed above, it may be that it dissolves in the fluoride bath but it may alternatively form sodium fluosilicate with the sodium fluoride of the bath. Whatever the mechanism of the reaction may be, according to this invention sodium fluosilicate or silicon tetrafluoride or both of these compounds can be added to the bath and reacted by the method disclosed herein, to form sodium aluminum fluoride and silicon-aluminum alloy.

The reaction zone is maintain at a temperature of at least about 800° C., and, preferably, the temperature in the reaction zone will be maintained at from about 850° C. to about 1000° C. The reaction will, however, proceed at higher temperatures and in some instances this would be advantageous in making an aluminum alloy of higher silicon content. However, a temperature of not over about 1000° C. is usually preferred because fluorides tend to volatilize out of the reaction zone more easily at a higher temperature, and, also, materials of construction suitable for use at temperatures of not over about 1000° C. are more readily available.

The reaction time will vary from a few minutes to several hours depending upon the amount of aluminum present, the rate of agitation, and the rate of fluosilicate addition. For example, for small batch operations the time may vary from one-half to four hours, to complete the reaction; whereas for larger operations, a greater length of time may be required. It is, of course, apparent that the time of reaction may readily be varied within reasonable limits to obtain complete reaction without the formation of undesirable sub-fluorides and carbides, it being a feature of this invention that reaction rates are high so that total reaction times are considerably reduced. The $SiF_4$ or sodium fluosilicate is added continuously to the reaction zone. This component is added at a rate which is about equivalent to the rate of reaction between it and the aluminum metal in order to maintain the low instantaneous concentration of the $SiF_4$ or $Na_2SiF_6$ as described above, and to maintain the low partial pressure of $SiF_4$ over the reaction mass or, in other words, to prevent escape of unreacted silicon tetrafluoride from the reaction mass.

Agitation can be effected mechanically, for example, by stirring the melt in the reaction zone with a paddle or with other well-known means. However, it is quite advantageous in some embodiments of the invention to carry out the reaction in an internal resistance furnace, such as the well known salt bath electrical furnaces wherein the contents of the reactor are well stirred because of the electrical forces acting within the reaction zone. When the reaction is carried out in an externally heated reaction vessel, stirring or agitation can be mechanically effected and the molten aluminum can be stirred into the fluoride bath to effect contact between the fluosilicate or its breakdown products and the aluminum metal in any part of the reaction mass. However, when the internal resistance furnace is employed agitation takes place principally within a layer comprising essentially the fluoride mass or bath and the fluosilicate dissolved or dispersed therein. In such an embodiment, the aluminum metal comprises a distinct layer within the reaction zone, generally a lower layer, although if the silicon content is sufficiently high, the metal layer may float on the fluoride bath. However, it is a particularly advantageous embodiment to maintain an upper layer comprising essentially the fluoride bath in which the fluosilicate is stirred or agitated by means of an internal electrical resistance furnace, and to maintain the metal as a lower fluid layer because in this manner stirring is directed mainly downwardly so that the incoming fresh fluosilicate as it disperses in the fluoride bath is directed downwardly into contact with the metal surface where it is reacted. It is believed that agitation provides a rapidly replaced interface between the aluminum metal phase and the fluoride phase, enabling a more rapid rate of reaction, and also provides rapid and uniform dissolution or dispersion of the silicon tetrafluoride or sodium fluosilicate in the fluoride, preventing high local concentrations thereof in the bath and preventing any substantial escape of $SiF_4$ from the bath.

It is an advantage of the present invention that the compounds are substantially completely reacted and that high yields of the sodium aluminum fluoride product are obtained. It is a further advantage that very little silicon tetrafluoride is lost and it is believed that this advantageous result is due to dispersion of the fluosilicate and/or the silicon tetrafluoride in the fluoride bath layer, whereby adequate retention is effected to permit substantially complete reaction with the aluminum. It has been observed in practical operation that there is very low partial pressure of silicon tetrafluoride in the atmosphere above the salt bath. Conversions of up to about 99.5% or more are effected by the process of this invention, and reaction times are substantially reduced, thus permitting higher feed rates of fluosilicate. It is a further advantage of the present process that carbides or sub-fluorides, for example of the aluminum, are not produced in appreciable amounts. If desired, mechanical agitation and internal resistance heating can be combined, with care to prevent contact of the aluminum metal with the electrodes.

The furnace or heating vessel employed is preferably made of carbon surfaces wherever there is contact with the salt bath or the molten metal. Various types of reaction vessels are shown in the accompanying drawings. Preferably the furnace or reaction vessel is closed to the atmosphere in order to prevent loss of reactants because, for example, sweep of air, especially if moist, over the surface of a bath would cause hydrolysis and diffusion of fluorides into the air. Preferably, prior to use the furnace should be flushed with a dry inert gas such as argon, or helium, for example, to remove water vapor and air.

Figure 2:
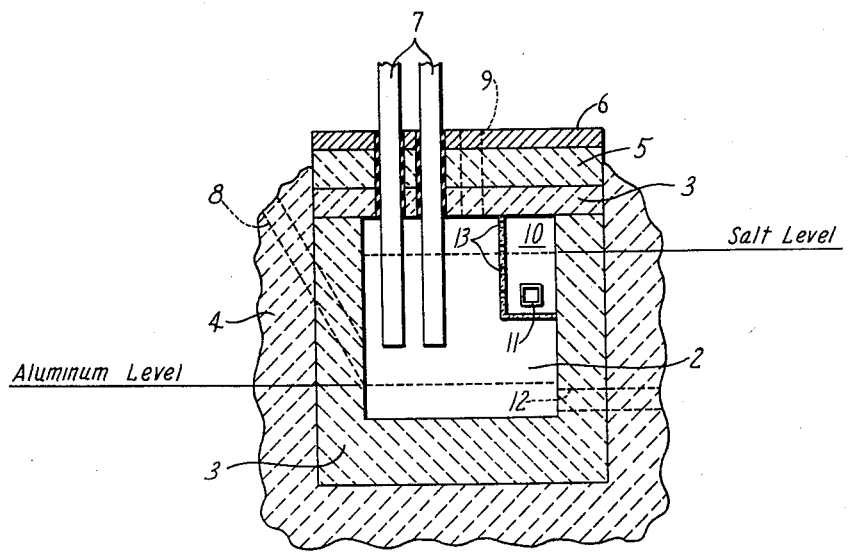
Fig. 2 is a vertical sectional view of the furnace of Fig. 1, along the line 2—2 of Fig. 1.

The device illustrated in Figs. 1 and 2 of the drawings comprises an internal resistance salt furnace which is useful in a continuous process, the internal resistance furnace being indicated generally at 1. The furnace consists of a carbon or graphite reactor having a deep rectangular trough 2 and thick walls 3. It is lagged with insulating brick 4 and fitted with a cover 5 supported by steel roof 6. In order to prevent attack of the brick by any silicon tetrafluoride gas which might escape, it should be made of silica or silicon carbide wherever such contact might occur. Graphite electrodes 7—7, of which one or both can be movable (means not shown), project through the cover and dip into the salt layer. They are electrically insulated from the cover. An aluminum feed line or chute 8 is provided in the wall of the furnace for delivering aluminum or aluminum alloy to the furnace. Another feed line 9 is provided for introduction of fluosilicate.

It is also advantageous in practice sometimes to provide a baffle between the point of entry for the aluminum and the electrodes so that the aluminum at no time would contact or short out the latter. The salt product of the reaction is collected in a chamber 10 which serves as a quiescent zone and into which the salt product enters by way of perforations or apertures 13. The salt is removed from chamber 10 by line 11, either continuously or intermittently as desired. The alloy product is withdrawn from the metal layer by way of line 12. In operation, aluminum and sodium fluosilicate are delivered to the furnace reaction chamber by means of feed lines 8 and 9 respectively, and reaction occurs therein; the temperature being maintained at between 850° C. and 1000° C., agitation being effected in the salt layer by means of strong electromagnetic forces created by the electrodes. Suitable levels for the salt layer and the metal layer are indicated in Fig. 2. However, these levels can be varied as desired, except that the metal layer is always maintained out of contact with the electrodes.

Fig. 3 shows a vertical sectional view of another device suitable for carrying out another embodiment of the present invention. In Fig. 3 the furnace is generally indicated at 21. The fluoride bath mass is introduced into the central portion 14 of reaction vessel 15 (disposed within furnace 21) which is fitted with a graphite paddle stirrer 16 mounted on shaft 17 and operated by any desired means (not shown). Aluminum metal, preferably in molten state, is fed in at 18 as indicated and sodium fluosilicate is fed in at 19 as indicated. These feed conduits are suitably fitted, respectively, with screw caps 25 and 26, to enable exclusion of air. Alternatively, a pressure-tight feeding mechanism, such as known to the art, can be employed in this embodiment; and in any of the embodiments shown. During the reaction the temperature of the reaction mass is maintained at at least 850° C. by means of Nichrome heating elements 20, disposed within the furnace and surrounding the lower portion of reaction vessel 15. The feed lines 18 and 19 referred to above pass through cover 22 which fits tightly on the top of the furnace and prevents access of air into the reaction zone or mass. After the reaction is substantially complete, agitation is stopped and the reaction mass allowed to settle, whereupon two layers are formed, one comprising the fluoride mass and the other comprising the metal alloy product. Suitably the reaction zone is maintained at such a temperature as will maintain these products in molten form and they are withdrawn through lines 23 and 24 as indicated; or alternatively, the mass is cooled until solidification occurs, after which the upper salt crust is removed from the lower alloy layer. In this embodiment and where internal resistance heating is not employed, the aluminum can be mixed thoroughly into the fluoride bath in carrying out the reaction.

Fig. 4 illustrates a vertical sectional view of still another device useful in carrying out the continuous process, which provides an advantageous retention time for the reacting mass. In this figure, the furnace is also indicated generally at 1. It includes four zones separated from each other by baffles 25, each of which is provided with a number of apertures to permit flow of the molten contents forwardly through the zones to the outlet end. It is to be understood that although four reaction zones are shown here, a greater or fewer number can alternatively be employed. Electrodes 7 pass through the cover of the furnace and dip into the salt layer in a similar manner as do the electrodes shown in Figs. 1 and 2. These electrodes likewise provide high current density and therefore efficient agitation in the salt layers in the respective zones. Sodium fluosilicate is fed in through line 26, suitably as pellets which drop into the salt layer 27 and are rapidly dissolved therein, aided by the agitation effected by the electromagnetic forces set up in the bath. Aluminum metal is fed in through a chute 30 to the lower portion of the first reaction zone where it forms a lower layer of molten aluminum metal having an upper level approximately as shown. As more reactants are fed in, the salt layer and the metal layer flow forwardly toward the outlet, passing through the respective apertures in the baffles shown. Stirring is effected in each zone by the electrode pairs installed therein. If desired, additional amounts of fluosilicate and of aluminum, or of either, can be added to the partly reacted mass in a zone subsequent to the initial zone, through suitable feed apertures (not shown). The reaction proceeds to completion by the time the fluoride and the metal reaches the last zone or compartment. Fluoride product is removed at 28 and alloy product at 29, removal being either continuous or intermittent as desired. The feed apertures are preferably fitted with pressure-tight feed mechanisms available in commerce (not shown).

Products produced by the method of the present invention comprise silicon-aluminum alloys containing up to about 50% silicon. The sodium aluminum fluorides produced hereby are complex mixtures low in silicon. The silicon content of the product made according to the present invention in a preferred operation does not exceed 0.5% by weight and can be as low as about 0.05% by weight. The metal products of this invention are useful as pre-alloys or master alloys in making aluminum and other alloys containing silicon and aluminum, and they are particularly valuable because of the low calcium content obtainable in this manner. The sodium aluminum fluorides are useful in the aluminum reduction operation well known in commerce. However, the product made by the processes described above is not a true cryolite, and in the event that a cryolite is desired, some additional sodium fluoride can be added in the reacting bath, suitably along with the sodium fluosilicate feed, in order to compensate for the deficiency in sodium fluoride.

It is not precisely known why the method of the present invention yields such high conversion of the reactants with low silicon content in the salt product, but it is postulated that the completeness of the reaction may be related to the interfacial area of the compounds reacting in the furnace, which is obtained by agitating in the presence of the sodium aluminum fluoride bath. It is believed that silicon tetrafluoride is dissolved in the bath, either as such or as the fluosilicate, but the fluosilicate ion is maintained at a low concentration and thereby maintains the vapor pressure of silicon tetrafluoride at a low value. The reactants are brought into effective contact by means of the agitation employed and, therefore, appreciable quantities of silicon tetrafluoride outside of the reaction mass are avoided. This is evidenced by a reduction in pressure of the system indicating substantially complete conversion of the silicon compound to aluminum fluoride and silicon-aluminum alloy. Increased rate of reaction is also obtained. The above remarks represent merely one theory or explanation of the new and unexpected results obtained by the present invention and it may be that other theories may also be applicable thereto, the present theory being merely a means for explaining the results according to the present invention and not being intended as a limitation. The following examples will serve to illustrate the invention with more particularity to those skilled in the art.

*Example 1*

About 298 grams of aluminum metal, 99.9+% pure, are melted in carbon crucible 15 fitted with a pressure-tight cover 22, in the device shown in Fig. 3. The crucible had been previously evacuated and flushed with argon to remove water vapor and air. The aluminum in the crucible is heated to about 900° C. Sufficient sodium aluminum fluoride of about the composition of chiolite is fed in to provide a thick covering layer over the molten aluminum, feeding being effected through one of the apertures 18 or 19 in the cover, both caps 25 and 26 being kept on except as 26 is removed to feed each fluosilicate pellet and then replaced. A stirrer 17 having a carbon paddle 16 also projects through the gas-tight cover and is operated in the usual manner by a small electric motor. It is operated so as to agitate the mix in the crucible at a rate of 440 r.p.m. Sodium fluosilicate, in the form of pellets of about 0.8 gram each, is fed into the molten bath, by way of the feed aperture in the cover, at the rate of 5.5 grams per minute until 895 grams have been added, this operation requiring 2.7 hours. At the end of this reaction time, agitation is continued for about fifteen minutes, after which the contents are permitted to settle for one hour before cooling.

In this example, the mass is then cooled and the upper salt crust is separately removed. The theoretical analysis of the salt, based on the silicon conversion, shows 42.9% NaF and 57.1% AlF₃, corresponding to the formula: 2(NaF·AlF₃)+2AlF₃. The silicon-aluminum alloy contains 51% silicon. The amount of silicon in the sodium aluminum fluoride is only 0.22% and conversion is 99.5%.

*Example 2*

This example is carried out in the same way as Example 1, except that in this run the system is left open to the atmosphere and there is added a total of 710 grams of sodium fluosilicate, fed as pellets at a rate of 7.16 grams per minute, and 300 grams of aluminum are added. Reaction time is about 1.75 hours after which the material is allowed to settle for one hour. 98% conversion is effected and the resulting silicon-aluminum alloy contains 40% silicon. Only 0.30% by weight of silicon is present in the sodium aluminum fluoride.

In other tests carried out, respectively, exactly as in Example 1 and in Example 2 above, but without agitation and without the presence of molten fluoride bath, the conversions were low and the silicon content of the salt was as high as 4.3%, which is undesirable when the product is to be employed in the production of aluminum metal. Conversion rates under such circumstances are only about 50 to 60% efficient. In operating according to the invention, the sodium fluosilicate pellets or agglomerates are fed to the reaction zone as rapidly as is possible without effecting any noticeable discharge of silicon tetrafluoride into the atmosphere. For instance, it is noted that there is a pressure increase in the reaction vessel after each pellet is dropped into the fluid bath in a device as in Fig. 3, but rapidly drops again as the reaction mass is stirred. Agitation is maintained at a high rate. In the above tests according to the invention, the maximum level of the liquid fluoride bath did not exceed six inches, and the amount of bath is not critical except that sufficient is added to receive and dissolve the sodium fluosilicate or silicon tetrafluoride as added.

The present invention provides a method for substantially complete conversion of sodium fluosilicate or silicon tetrafluoride, or a mixture of the two, and aluminum, in the presence of sodium aluminum fluoride, into sodium aluminum fluoride containing low amounts of silicon. It is possible by the present process to obtain a sodium aluminum fluoride product containing not over 0.5% of silicon, and in some instances as low as 0.05% silicon. It is also possible by the present invention to obtain aluminum alloys of varying silicon content, and the amount of aluminum added in the reaction mass can be varied to obtain the desired aluminum-silicon ratio in the final alloy. However, as the silicon content increases above 40% silicon, separation of the alloy from the sodium fluoride melt becomes more difficult and, in practice, about 50% of silicon is the upper economical limit, having in mind the problems of separation. It is an advantage of the present invention that the speed of reaction is quite rapid; and it is a further advantage that the method provides for efficient conversion of the reactants. It is a further advantage that the present invention enables maintaining a low instantaneous concentration of fluosilicate in the fluoride bath, which has the advantageous result that there is very little, or no, escape of silicon tetrafluoride from the reaction medium. The respective amounts of sodium fluoride and of aluminum fluoride in the sodium aluminum fluoride product can be varied, for example, by admixing NaF in the bath, or by varying the composition of the starting bath. The amount of aluminum reactant employed is at least sufficient to react with all of the sodium fluosilicate employed, and can be varied otherwise and above this amount, depending upon the composition of the Si alloy desired.

It is to be understood that where "aluminum" is mentioned in this specification and claims, that it is intended to include aluminum base alloys which provide aluminum metal for the reaction. Types or species of internal electrical resistance heating and stirring devices other than those specifically described and shown herein can be employed. Where percentages are given herein, they are percentages by weight unless otherwise specified.

Having now described the invention, what is claimed is:

1. In a method for producing sodium aluminum fluoride and silicon-aluminum alloy, the steps which comprise providing in a reaction zone at a temperature of from 800° C. to 1000° C. a molten fluoride bath, consisting essentially of at least one compound chosen from the group consisting of sodium fluoride and sodium aluminum fluoride, adding aluminum metal to said reaction zone in contact with said bath, continuously adding at least one substance chosen from the group consisting of silicon tetrafluoride and sodium fluosilicate into admixture with said bath at a rate equivalent to the rate of reaction with said aluminum, and vigorously agitating said admixture, and reacting to form sodium aluminum fluoride and silicon-aluminum alloy, said sodium fluoride being added in at least an amount to react with aluminum fluoride produced by reaction between said silicon tetrafluoride and said aluminum metal.

2. Method of producing sodium aluminum fluoride containing not over 0.5% by weight silicon and silicon-aluminum alloy which comprises providing a molten mass of sodium aluminum fluoride in a reaction zone maintained at a temperature of from about 850° C. to about 1000° C., introducing aluminum metal into said reaction zone, continuously introducing sodium fluosilicate into said molten mass at a rate equivalent to the rate of reaction with said aluminum, vigorously agitating said molten mass to dissolve said fluosilicate in said fluoride and to prevent escape of silicon tetrafluoride from the mass, reacting to form sodium aluminum fluoride and silicon-aluminum alloy, and separately withdrawing said sodium aluminum fluoride and said silicon-aluminum alloy while in the molten state.

3. Method as in claim 2 wherein there is produced silicon-aluminum alloy containing up to about 50% silicon.

4. Process as in claim 2 wherein said mass is mechanically agitated while the temperature of the reaction zone is maintained by externally heating.

5. Method of producing sodium aluminum fluoride containing not over 0.5% by weight of silicon, and silicon-aluminum alloy, which comprises continuously introducing sodium fluosilicate into a molten mass of previously formed sodium aluminum fluoride in a reaction zone, simultaneously flowing molten aluminum into said reaction zone as a lower layer therein, maintaining said reaction zone at a temperature of from about 850° C. to about 1000° C., agitating said molten mass of said fluoride to dissolve said fluosilicate therein and prevent escape of silicon tetrafluoride from said molten mass, maintaining said molten mass of fluoride and said molten aluminum in contact at said temperature to react and to form an upper layer consisting essentially of said sodium aluminum fluoride containing not over 0.5% by weight of silicon, and a lower layer consisting essentially of silicon-aluminum alloy.

6. Method of producing sodium aluminum fluoride containing not over 0.5% by weight of silicon, and silicon-aluminum alloy, which comprises continuously introducing sodium fluosilicate into a molten mass of previously formed sodium aluminum fluoride in a reaction zone, simultaneously flowing molten aluminum into said reaction zone as a lower layer therein, maintaining said reaction zone at a temperature of from about 850° C. to about 1000° C., agitating said molten mass of said fluoride to dissolve said fluosilicate therein and prevent escape of silicon tetrafluoride from said molten mass, maintaining said molten mass of fluoride and said molten aluminum in contact at said temperature to form an upper layer consisting essentially of said sodium aluminum fluoride containing not over 0.5% by weight of silicon, and a lower layer consisting essentially of silicon-aluminum alloy, and separately withdrawing said sodium aluminum fluoride and said silicon-aluminum alloy.

7. Method of producing sodium aluminum fluoride containing not over 0.5% by weight of silicon, and silicon-aluminum alloy, which comprises providing in a reaction zone at a temperature of about 850° C. to about 1000° C. a bath of molten sodium aluminum fluoride, providing a layer of aluminum in said zone below said bath and in contact therewith, continuously introducing agglomerated sodium fluosilicate into admixture with said bath and vigorously agitating said admixture to maintain a low vapor pressure of silicon tetrafluoride above said bath, and reacting to form sodium aluminum fluoride containing not over 0.5% by weight of silicon and silicon-aluminum alloy, allowing the reaction mass to settle to form an upper layer consisting essentially of said sodium aluminum fluoride and a lower layer consisting essentially of silicon-aluminum alloy, and separately removing said fluoride layer and said alloy layer.

8. A method of producing synthetic cryolite containing not over 0.5% by weight of silicon which comprises introducing into a reaction zone maintained at from about 850° C. to 1000° C. a mass of sodium aluminum fluoride, continuously introducing into said mass sodium fluosilicate and sodium fluoride, said sodium fluoride being added in an amount to form cryolite with excess aluminum fluoride formed during reaction, simultaneously introducing into said reaction zone aluminum metal, and reacting to form cryolite containing not over 0.5% silicon and silicon-aluminum alloy, conducting said reaction mass to a settling zone, and there forming an upper layer of cryolite and a lower layer of silicon-aluminum alloy, and separately withdrawing said cryolite and said alloy.

9. Method of producing sodium aluminum fluoride containing not over 0.5% by weight of silicon, and silicon-aluminum alloy containing up to about 50% silicon, which comprises continuously introducing sodium fluosilicate into a molten mass of previously formed sodium aluminum fluoride in a recation zone, simultaneously flowing molten aluminum into said reaction zone as a lower layer therein, maintaining said reaction zone at a temperature of from about 850° C. to about 1000° C., agitating said molten mass of said fluoride to dissolve said fluosilicate therein and prevent escape of silicon tetrafluoride from said molten mass, maintaining said molten mass of fluoride and said molten aluminum in contact at said temperature to react and to form an upper layer consisting essentially of said sodium aluminum fluoride containing not over 0.5% by weight of silicon, and a lower layer consisting essentially of silicon-aluminum alloy containing up to about 50% silicon.

10. Method of producing sodium aluminum fluoride containing not over 0.5% silicon and silicon-aluminum alloy comprising providing a molten bath of sodium aluminum fluoride in a reaction zone maintained at a temperature of from about 850° C. to 1000° C., introducing aluminum metal into said reaction zone, continuously introducing sodium fluosilicate into said molten bath at a rate equivalent to the rate of reaction between said fluosilicate and said aluminum, mechanically agitating to dissolve said fluosilicate in said fluoride bath and to prevent escape of silicon tetrafluoride from the mass, reacting to form sodium aluminum fluoride and silicon aluminum alloy, and separately withdrawing said sodium aluminum fluoride and said silicon-aluminum alloy while in molten state.

11. A method of producing sodium aluminum fluoride containing not over 0.5% by weight of silicon, and silicon aluminum alloy, which comprises introducing into a reaction zone maintained at from about 850° C. to 1000° C. a mass consisting essentially of at least one compound chosen from the group consisting of sodium fluoride and sodium aluminum fluoride, continuously introducing into said mass with vigorous mechanical agitation at least one compound chosen from the group consisting of silicon tetrafluoride and sodium fluosilicate, simultaneously introducing into said reaction zone aluminum metal, and reacting to form sodium aluminum fluoride containing not over 0.5% silicon and silicon aluminum alloy, allowing the reaction mass to settle to form an upper layer consisting essentially of said sodium aluminum fluoride and a lower layer consisting essentially of silicon-aluminum alloy, and separately removing said fluoride layer and said alloy layer, said sodium fluoride being added in at least an amount to react with aluminum fluoride produced by reaction between said silicon tetrafluoride and said aluminum metal.

References Cited in the file of this patent
UNITED STATES PATENTS

| | | |
|---|---|---|
| 1,464,625 | Pacz | Aug. 14, 1923 |
| 1,518,872 | Pacz | Dec. 9, 1924 |

OTHER REFERENCES

J. W. Mellor's "A Comprehensive Treatise on Inorganic and Theoretical Chemistry," vol. 5, 1924 ed., page 217, Longmans, Green and Co., New York, N.Y.